United States Patent
Xie et al.

(10) Patent No.: US 12,079,094 B2
(45) Date of Patent: Sep. 3, 2024

(54) DATA BACKUP METHOD, DATA RECOVERY METHOD, AND ELECTRONIC EQUIPMENT

(71) Applicant: ZILLIZ INC., San Francisco, CA (US)

(72) Inventors: Chao Xie, San Francisco, CA (US); Yuchen Gao, Shanghai (CN); Anyang Wang, Shanghai (CN)

(73) Assignee: ZILLIZ INC., San Francisco, CA (US)

( * ) Notice: Subject to any disclaimer, the term of this patent is extended or adjusted under 35 U.S.C. 154(b) by 11 days.

(21) Appl. No.: 18/155,481

(22) Filed: Jan. 17, 2023

(65) Prior Publication Data

US 2024/0241796 A1 Jul. 18, 2024

(51) Int. Cl.
*G06F 11/00* (2006.01)
*G06F 11/14* (2006.01)
*G06F 16/11* (2019.01)
*G06F 16/16* (2019.01)

(52) U.S. Cl.
CPC ...... *G06F 11/1469* (2013.01); *G06F 11/1451* (2013.01); *G06F 16/122* (2019.01); *G06F 16/162* (2019.01); *G06F 2201/84* (2013.01)

(58) Field of Classification Search
CPC ............ G06F 11/1469; G06F 11/1481; G06F 2201/84
USPC ....................................... 714/1–57
See application file for complete search history.

(56) References Cited

U.S. PATENT DOCUMENTS

| | | | | |
|---|---|---|---|---|
| 7,502,970 B2 * | 3/2009 | Aizawa | ................ | G11C 16/344 714/48 |
| 11,775,396 B1 * | 10/2023 | Bharadwaj | .......... | G06F 11/1469 714/4.11 |
| 2005/0193236 A1 * | 9/2005 | Stager | ................. | G06F 11/1448 714/6.11 |
| 2008/0243954 A1 * | 10/2008 | Augenstein | ......... | G06F 11/1451 |
| 2014/0189432 A1 * | 7/2014 | Gokhale | ............. | G06F 11/1464 714/41 |
| 2015/0324247 A1 * | 11/2015 | Hoshi | ................. | G06F 11/0769 714/57 |
| 2016/0117227 A1 * | 4/2016 | Hetrick | ................ | G06F 11/1469 714/19 |
| 2016/0132400 A1 * | 5/2016 | Pawar | ................. | G06F 11/3409 707/679 |
| 2020/0241967 A1 * | 7/2020 | Dain | .................... | G06F 11/0793 |
| 2020/0319976 A1 * | 10/2020 | Shu | ...................... | G06F 11/1453 |
| 2022/0058089 A1 * | 2/2022 | Shemer | ............... | G06F 11/2094 |

(Continued)

*Primary Examiner* — Sarai E Butler
(74) *Attorney, Agent, or Firm* — Kim IP Law Group LLC

(57) ABSTRACT

A data backup method, a data recovery method, and an electronic device are disclosed. The data backup method includes: determining a data set to be backed up, performing a status update operation on a data block in the data set, determining the time points when the data block changes from the first phase to the second phase, and when the data block changes from the second phase to the third phase, and performing data backup on the data set to generate backup files. With this method, upon data seal time point, no fresh data can be reached in any data block, and the data block back-up persists, so that the time point of the data backup operation is more accurate, the cut point of which deleted data should be included in the back up is easy to locate, and the deleted data may be accurately processed.

14 Claims, 4 Drawing Sheets

(56) References Cited

U.S. PATENT DOCUMENTS

2023/0082186 A1* 3/2023 Balcha ............... G06F 11/2094
 714/4.11

* cited by examiner

DATA BACKUP METHOD, DATA RECOVERY METHOD, AND ELECTRONIC EQUIPMENT

TECHNICAL FIELD

The disclosure relates to the technical field of terminal equipment. More particularly, the present invention relates to a data backup method, a data recovery method, and an electronic device.

BACKGROUND OF THE INVENTION

In order to manage the information effectively, the database technology has been applied more and more widely. In the database, information may be stored in the form of a data file. In order to ensure the security of the database, the database needs to be backed up periodically. When the data file is lost, the database can be restored through the backed-up data.

Currently, a database backup is usually performed in an online backup manner, that is, a data file is backed up during normal operation of the database. However, performing the online backup may affect performance of operation of the database, and may further cause a slow access speed of an application service using the database. Therefore, there is a need for a backup manner that can reduce impact on the application service.

SUMMARY OF THE INVENTION

The disclosure provides an apparatus, a data backup method, a data recovery method, and a computer-readable storage medium.

An embodiment of the disclosure provides an apparatus comprising: a memory for storing database data; and a processor configured to execute following process, comprising: determining a data set to be backed up, and performing a status update operation on a data block included in the data set to be backed up; recording a first timing when the data block changes from a first phase to a second phase; recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified.

According to apparatus provided in the disclosure, since each data block in the data block set to be backed up is no longer written with new data and the data block to be backed up has been persisted since the second timing (time_of_seal) of executing the status update operation to the third timing (T1) of executing the status update operation, the time point of the data backup operation is more accurate, and at the same time, the cut point of the deleted data is easy to locate, the deleted data can be normally processed, the processing truncation point of the deleted data is clear, and the deleted data to be processed and the deleted data not to be processed can be clearly divided.

In a possible implementation of the first aspect, the status update operation is used to control the change of the data block in the first phase or the second phase to the third phase.

According to apparatus provided in the disclosure, the first phase, the second phase and the third phase is corresponding to the growing, sealed, and flushed phase. A status update operation can be performed on the data block so that the phases of the data blocks can be updated.

In a possible implementation of the first aspect, when the data block changes from the second phase to a third phase, and performing data backup on the data set to be backed-up to obtain a backup file, comprises:
   acquiring user data and metadata corresponding to the data block between the first timing and the second timing when the phase of the data block is changed to the third phase;
   storing the user data and the metadata as a backup file of the data set to be backed up.

According to apparatus provided in the disclosure, since each data block in the data block set to be backed up is no longer written in with new data and the data block to be backed up has been dropped since the start time (time_of_seal) of the status update operation to the completion time (T1) of the status update operation to be executed.

In a possible implementation of the first aspect, further comprising: determining a time period between the first timing and the second timing as a backup time, the backup file having an association relationship with the backup time.

According to apparatus provided in the disclosure, the time point of the data backup operation obtained by the data backup method according to the embodiment of the disclosure is more accurate than the backup time period determined by executing the backup instruction until the backup file is obtained.

In a possible implementation of the first aspect, further comprising:
   acquiring a data deleting operation performed on the to-be-backed-up data set within a time period corresponding to the backup time;
   there is an association between the data deleting operation and the backup time.

According to apparatus provided in the disclosure, the time point of the data backup operation obtained by the data backup method according to the embodiment of the disclosure can be easy to locate, and the delete data can be normally processed. Further, the processing truncation point of the delete data can be clear, and the delete data to be processed and the delete data not to be processed can be clearly divided.

In a possible implementation of the first aspect, the backup file further includes a phase of a data block included in the data set to be backed up when performing the status update operation.

According to apparatus provided in the disclosure, in the backup process, each data block in the set of data blocks to be backed up is no longer written with new data and the data blocks to be backed up have been persisted, so that the integrity of the data is ensured and the time point of data backup is more accurate.

In a second aspect, an embodiment of the disclosure provides an apparatus comprising: a memory for storing database data; and a processor configured to execute following process, comprising: determining a to-be-restored data set, and acquiring a backup file corresponding to the to-be-restored data set; performing data recovery on the to-be-restored data set according to the backup time corresponding to the backup file; performing a data deleting operation within a time period corresponding to the backup time to obtain user data and metadata corresponding to the to-be-restored data set.

According to apparatus provided in the disclosure, a time point of a backup operation when a backup file is generated is relatively accurate, and not only can accurately recover data that has been backed up, but also can ensure that a cut point of delete data in a backup process is easy to locate, the delete data can be normally processed, a processing truncation point of the delete data is clear, and the delete data to be processed and the delete data not to be processed can be explicitly divided.

In a possible implementation of the second aspect, further comprising: restoring the phase of the data blocks included in the to-be-recovered data set.

According to the data recovery method provided in the disclosure, the segmentation point of the delete data in the backup process is easy to locate, the delete data can be processed normally, the processing truncation point of the delete data is clear, and the delete data to be processed and the delete data not to be processed can be explicitly segmented.

In a third aspect, an embodiment of the disclosure provides a data backup method performed by at least one processor, comprising: determining a data set to be backed up, and performing a status update operation on a data block included in the data set to be backed up; recording a first timing when the data block changes from a first phase to a second phase; recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified.

According to data backup method provided in the disclosure, since each data block in the data block set to be backed up is no longer written with new data and the data block to be backed up has been persisted since the second timing (time_of_seal) of executing the status update operation to the third timing (T1) of executing the status update operation, the time point of the data backup operation is more accurate, and at the same time, the cut point of the deleted data is easy to locate, the deleted data can be normally processed, the processing truncation point of the deleted data is clear, and the deleted data to be processed and the deleted data not to be processed can be clearly divided.

In a fourth aspect, an embodiment of the disclosure provides a data recovery method performed by at least one processor, comprising:
determining a to-be-restored data set, and acquiring a backup file corresponding to the to-be-restored data set; performing data recovery on the to-be-restored data set according to the backup time corresponding to the backup file; performing a data deleting operation within a time period corresponding to the backup time to obtain user data and metadata corresponding to the to-be-restored data set.

According to the data recovery method provided in the disclosure, the segmentation point of the delete data in the backup process is easy to locate, the delete data can be processed normally, the processing truncation point of the delete data is clear, and the delete data to be processed and the delete data not to be processed can be explicitly segmented.

In a fifth aspect, an embodiment of the disclosure provides a computer-readable storage medium having stored thereon instructions that, when executed on an electronic device, cause the electronic device to perform a method comprising:
determining a data set to be backed up, and performing a status update operation on a data block included in the data set to be backed up; recording a first timing when the data block changes from a first phase to a second phase; recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified.

According to the computer-readable storage medium provided in the disclosure, since each data block in the data block set to be backed up is no longer written with new data and the data block to be backed up has been persisted since the second timing (time_of_seal) of executing the status update operation to the third timing (T1) of executing the status update operation, the time point of the data backup operation is more accurate, and at the same time, the cut point of the deleted data is easy to locate, the deleted data can be normally processed, the processing truncation point of the deleted data is clear, and the deleted data to be processed and the deleted data not to be processed can be clearly divided.

In a sixth aspect, an embodiment of the disclosure provides a computer-readable storage medium having stored thereon instructions that, when executed on an electronic device, cause the electronic device to perform a method comprising: determining a to-be-restored data set, and acquiring a backup file corresponding to the to-be-restored data set; performing data recovery on the to-be-restored data set according to the backup time corresponding to the backup file; performing a data deleting operation within a time period corresponding to the backup time to obtain user data and metadata corresponding to the to-be-restored data set.

According to the computer-readable storage medium provided in the disclosure, the segmentation point of the delete data in the backup process is easy to locate, the delete data can be processed normally, the processing truncation point of the delete data is clear, and the delete data to be processed and the delete data not to be processed can be explicitly segmented.

DETAILED DESCRIPTION

Figure 1:
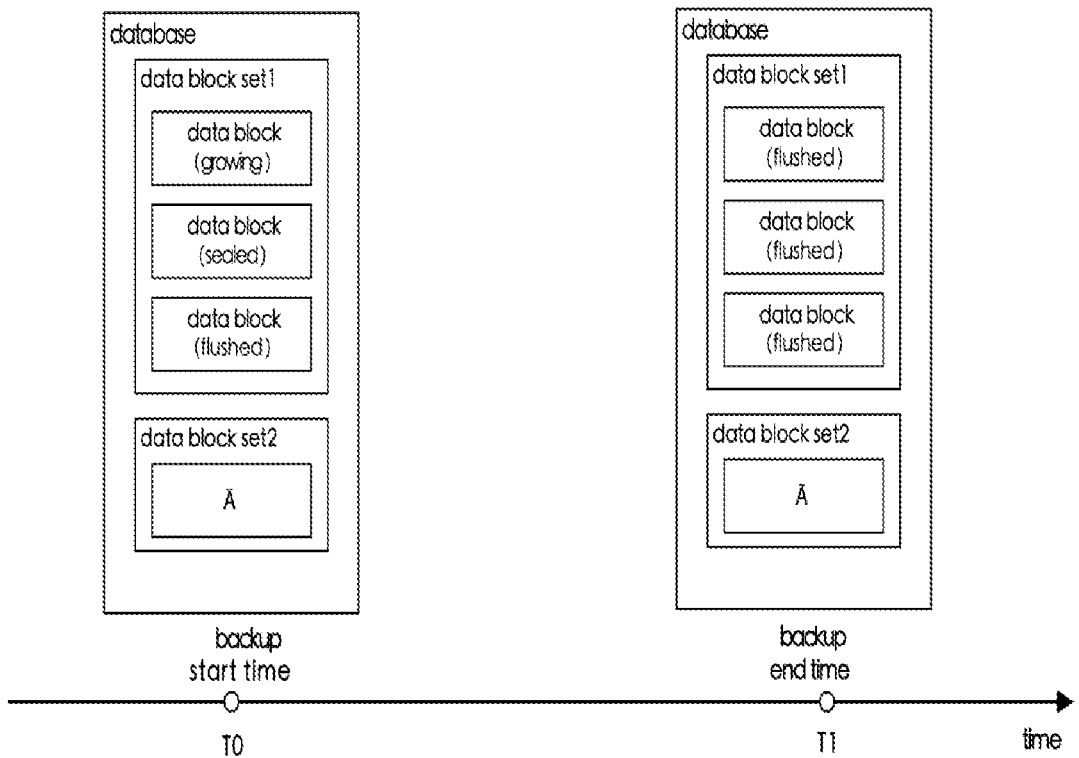
FIG. 1 is a graph showing a data backup method according to an embodiment of the disclosure.

Reference will now be made in detail to the various embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout this disclosure, various aspects of the subject disclosure can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure can be combined in any suitable manner in one or more embodiments. One skilled in the relevant art will recognize, in light of the description herein, that the present disclosure can be practiced without one or more of the specific features or advantages of a particular exemplary embodiment. In other instances, additional features and advantages can be recognized in certain embodiments that cannot be present in all exemplary embodiments of the subject disclosure.

Some of the terms used in this application are explained below to facilitate the understanding of those skilled in the art.

Data block(segment), which may be a storage structure for storing user data. Each data block in the database has a data block identification (seg_ID) for uniquely determining the data block. Each data block may include three phases, including, for example, growing, sealed, and flushed. The growing phase can indicate that the data block can accept a new data write. The sealed phase can indicate that the data block is disabled and cannot accept a new data write, and will be set to the flushed phase. The flushed phase can indicate that the data block has been persisted, that is, in the flushed phase, the persistence of the data in the data block has been completed.

Data block set(collection), a data block set may be consisting of a plurality of data blocks, each data block set may have a data block set identification (collection_ID) for uniquely determining the data block set.

Metadata, which is a set of data that describes and gives information about other data and can be regarded as an abstract information corresponding to the data, can be mainly used to describe context information of the data.

FIG. 1 is showing a schematic diagram for backing up a database. As shown in FIG. 1, the database includes a plurality of data block sets, such as the data block set 1 and the data block set 2 (FIG. 1). For example, the data block set 1 to be backed up may be determined at timing of T0 and a backup instruction may be executed on the data block set 1 until the backup is completed at timing of T1. It can be seen that T0 may be the backup start time and T1 may be the backup end time. The time period between T0 and T1 may be the backup time period of the data block set 1. The backup file of the data block set 1 may include user data of the data block set 1 and metadata corresponding to the data block set 1 in a time period between T0 and T1. However, at T0, the data block set 1 may further include a data block in the growing phase and a data block in the sealed phase. When the data block set 1 is backed up, only the data blocks in the flushed phase may be backed up, and the data blocks in the growing phase and the data blocks in the sealed phase may be ignored. As a result, data loss may occur in the backed-up data block set 1.

In some embodiments, for example, a backup instruction may be executed on the data block set 1 at T0. In order to avoid data loss, it is necessary to wait for the growing data block and the sealed data block to be set to the flushed phase before backing up the data block to complete the backup of data block set 1. That is, the start time for performing the backup of data block set 1 should be between T0 and T1. Therefore, T0 is not an accurate backup start time. When the time period formed from T0 to T1 is used as the backup time period of the data block set 1, the backup file of the data block set 1 may contain redundant data, and the storage space for storing the backup file may increase.

Figure 2:
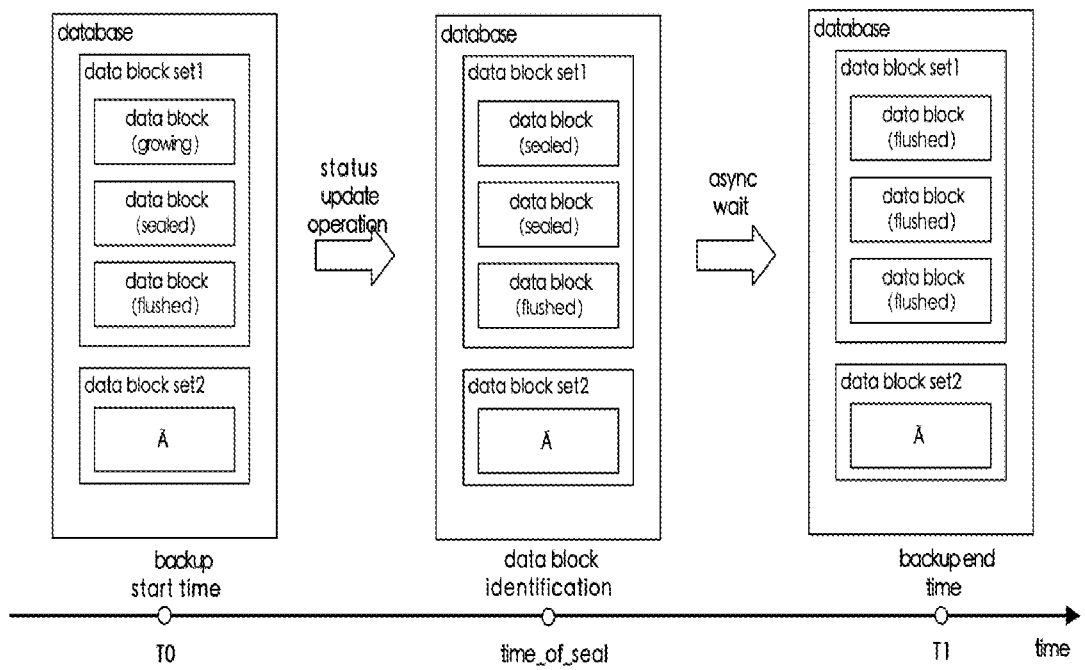
FIG. 2 is a graph showing a data backup method according to an embodiment of the disclosure.

To solve the above problem, an embodiment of the disclosure provides a data backup method. Referring to FIG. 2, a data block set to be backed up in a database can be determined at a time (T0 shown in FIG. 2), a data block (data block identification, backup_seg_IDs) included in the data block set can be acquired, and a status update operation can be performed on the data block so that the phases of the data blocks can be totally updated to a flushed phase and a start time (time_of_seal shown in FIG. 2) for performing the status update operation is recorded. When status update operation is performed, the phase of the data block can be updated from the sealed phase to the flushed phase, or from the growing phase to the flushed phase. Until the phases of all the data blocks to be updated to the flushed phase, a completion time (T1 shown in FIG. 2) for executing the status update operation can be recorded, and user data together with the metadata corresponding to the data blocks to be backed up can be extracted and stored as original backup data (raw backup data), and metadata corresponding to the original backup data can also be stored to describe context information of the original backup data. After T1, the original backup data can be verified, the metadata corresponding to the original backup data can be processed, and the processed original backup data and metadata can be saved as final backup data (final backup data). The start time (time_of_seal) for executing the status update operation can be determined as the start time of the data backup, the completion time (T1) for executing the status update operation can be determined as the completion time of the data backup, and the time period formed by time_of_seal and T1 can be the backup time.

According to the data backup method according to the embodiment of the disclosure, since each data block in the data block set to be backed up is no longer written in with new data and the data block to be backed up has been dropped since the start time (time_of_seal) of the status update operation to the completion time (T1) of the status update operation to be executed, the time point of the data backup operation obtained by the data backup method according to the embodiment of the disclosure is more accurate than the backup time period determined by executing the backup instruction until the backup file is obtained. At the same time, the time point of the data backup operation obtained by the data backup method according to the embodiment of the disclosure can be easy to locate, and the delete data can be normally processed. Further, the processing truncation point of the delete data can be clear, and the delete data to be processed and the delete data not to be processed can be clearly divided.

In some embodiments, the database herein may be a Milvus database, and the data blocks in the Milvus may be used to persist scalar data and vector data. The status update operation performed on the data block may be a flush operation, or may be referred to as a flashing operation, for persisting the data block temporarily stored in the memory to the storage area.

Figure 3:
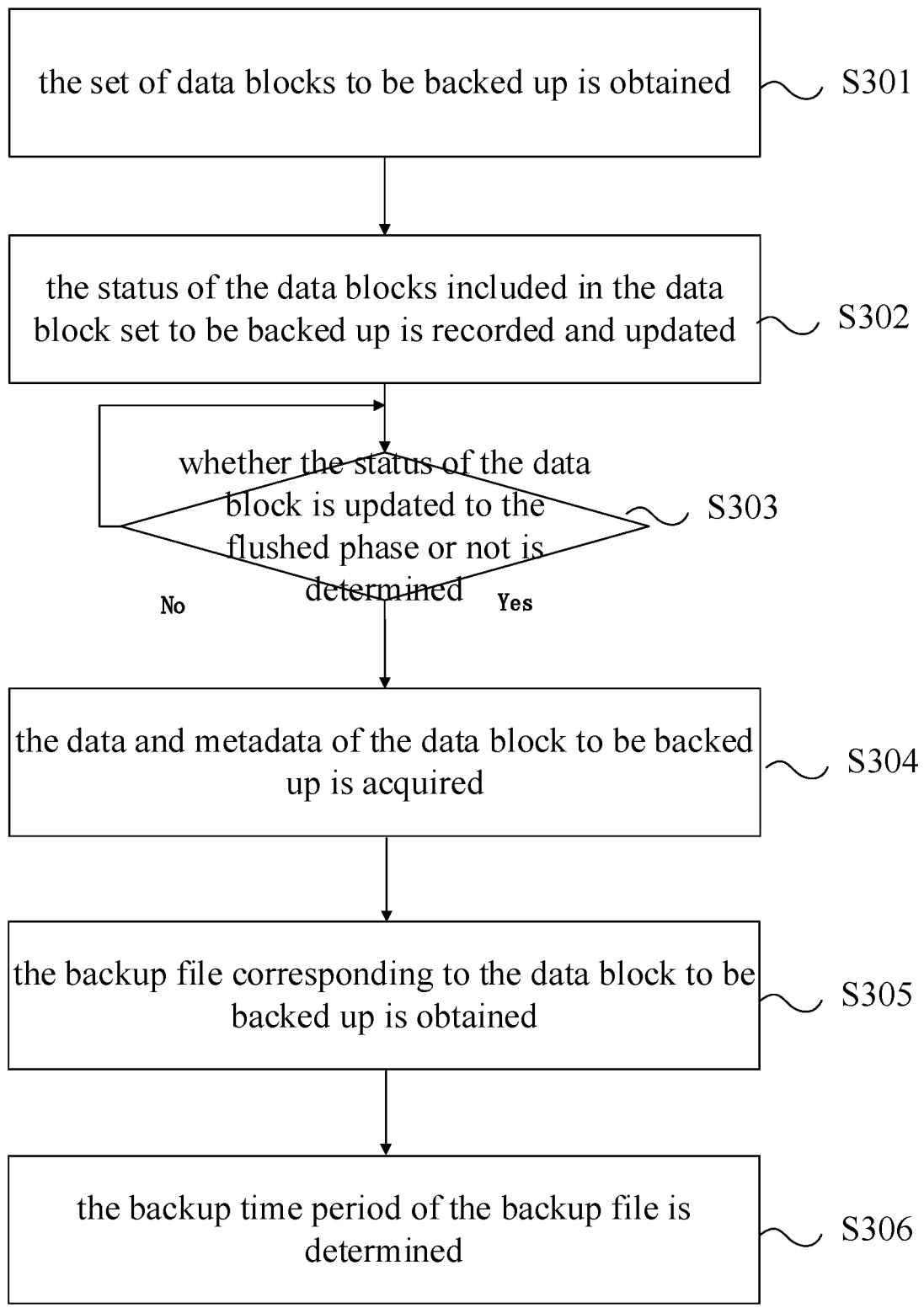
FIG. 3 is a graph showing a data backup method according to an embodiment of the disclosure.

The process of the data backup method provided by the embodiment of the disclosure is described in detail based on the method flow diagram shown in FIG. 3. The method shown in FIG. 3 may be implemented by the processor of an electronic device.

The method shown in FIG. 3 includes:

In S301, the set of data blocks to be backed up is obtained.

Illustratively, the current time T0 is recorded, and all data block sets in the database at T0 are acquired, from which the data block set to be backed up, that is, the data block set to be backed up, is determined. The set of data blocks to be backed up herein may include a data block set identification (collection_ID), i.e. the identification of the set of data blocks may be uniquely determined in the database.

In S302, the phase of the data blocks included in the data block set to be backed up is recorded and updated.

Illustratively, a data block to be backed up is determined from a data block set to be backed up, each data block has a backup_seg_IDs, i.e., the identification of the data block may be uniquely determined in the data block set. Each data block may include three phases growing, sealed, and flushed, and the data block to be backed up performs a status update operation such that the phase of the data block to be backed up is updated from growing to sealed, or, from sealed to flushed.

In some embodiments, the start time(time_of_seal) at which the status update operation is performed, that is, the start time(time_of_seal) at which the flush operation is performed, that is, the time at which the data block to be backed up in the data block set whose phase is updating from growing to sealed, is recorded, and the start time (time_of_seal) at which the status update operation is performed is determined as the start time of the data backup. It can be understood that after the status update operation is performed, the data blocks of the data block set to be backed up do not accept new data writing, and only accept data deleting.

In S303, whether the phase of the data block is updated to the flushed phase or not is determined.

Illustratively, after the status update operation is performed on the data blocks to be backed up, the phase of each data block to be backed up may be polled. After the phases of all the data blocks to be backed up are updated to the flushed phase, that is, after all the data blocks to be backed up are persisted, that is, all the data blocks to be backed up are persisted to the storage area of the electronic device running the database, step S304 is performed to acquire metadata of the data blocks to be backed up; Otherwise, step S303 is continued until the phase of the data block is updated to the flushed phase.

In S304, the data and metadata of the data block to be backed up is acquired.

Illustratively, after the phases of the data blocks to be backed up are all updated to the flushed phase, the completion time of the recording status update operation is T1, and the completion time (T1) of executing the status update operation is determined as the completion time of the data backup. Next, the user data and the metadata of the data block to be backed up are acquired according to the data block identification (backup_seg_IDs) corresponding to the data block to be backed up, where the user data may be scalar data and vector data stored in the data block, and the metadata may be used to describe context information of the user data.

Figure 4:
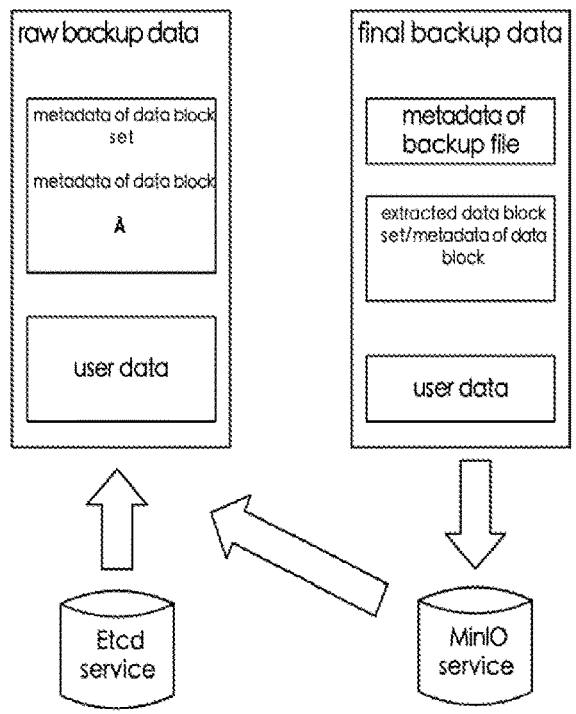
FIG. 4 is a graph showing a data backup method according to an embodiment of the disclosure.

In some embodiments, as shown in FIG. 4, for the Milvus database, the user data herein may be binlog information, the binlog of the Milvus data may be divided into insertlog, deltalog, and statslogs, and the binlog information may be stored in binary form. The metadata herein may be data obtained from the Etcd service of the Milvus database, which is a service for the Milvus database to store metadata.

In S305, the backup file corresponding to the data block to be backed up is obtained.

Illustratively, as shown in FIG. 4, the user data and the metadata corresponding to the data block to be backed up are saved as the original backup data (raw backup data), and the original backup data is processed and verified. The key metadata in the original backup data can be reorganized to generate the related metadata of the current backup file. Finally, the related metadata is stored in the MinIO together with the user data as the formal final backup data (final backup data), that is, the backup file. The MinIO here may be a service of the Milvus database for persisting user data. The related metadata of the backup file herein may be used to record the phase of a data block to be backed up when performing a backup operation.

In S306, the backup time period of the backup file is determined.

Illustratively, the backup time period herein may be a time period formed between the start time time_of_seal of performing the status update operation and the completion time (T1) of performing the status update operation, and as the backup time, the saved final backup data, that is, the backup file, is associated with the backup time.

It can be seen that according to the data backup method described in FIG. 3, after the data block set to be backed up is determined, the phase of the data block included in the data block set can be changed first, the start time of changing the phase of the data block to be backed up is determined as the start time of the data backup, and the completion time of completing the phase change of the data block to be backed up is determined as the completion time of the data backup to obtain the backup time. In the backup process, each data block in the set of data blocks to be backed up is no longer written with new data and the data blocks to be backed up have been persisted, so that the integrity of the data is ensured and the time point of data backup is more accurate.

In some embodiments, the process of creating the backup file may be a process of exporting the original data and the metadata corresponding to the data set to be backed up in a storage. If a problem occurs in the backup process or the data generated by the backup is incorrect, the backup file in the storage may be an invalid backup, and all files in the entire storage may be directly deleted when the backup file is cleaned.

It will be appreciated that after the data backup of the database has been completed, the database may also be restored with the last backup data that has been saved, i.e. the backup file and the backup time. The process of the data recovery method provided by the embodiment of the disclosure is described in detail based on the method flow diagram shown in FIG. 5. The method shown in FIG. 5 may be implemented by the processor of a electronic device.

Figure 5:
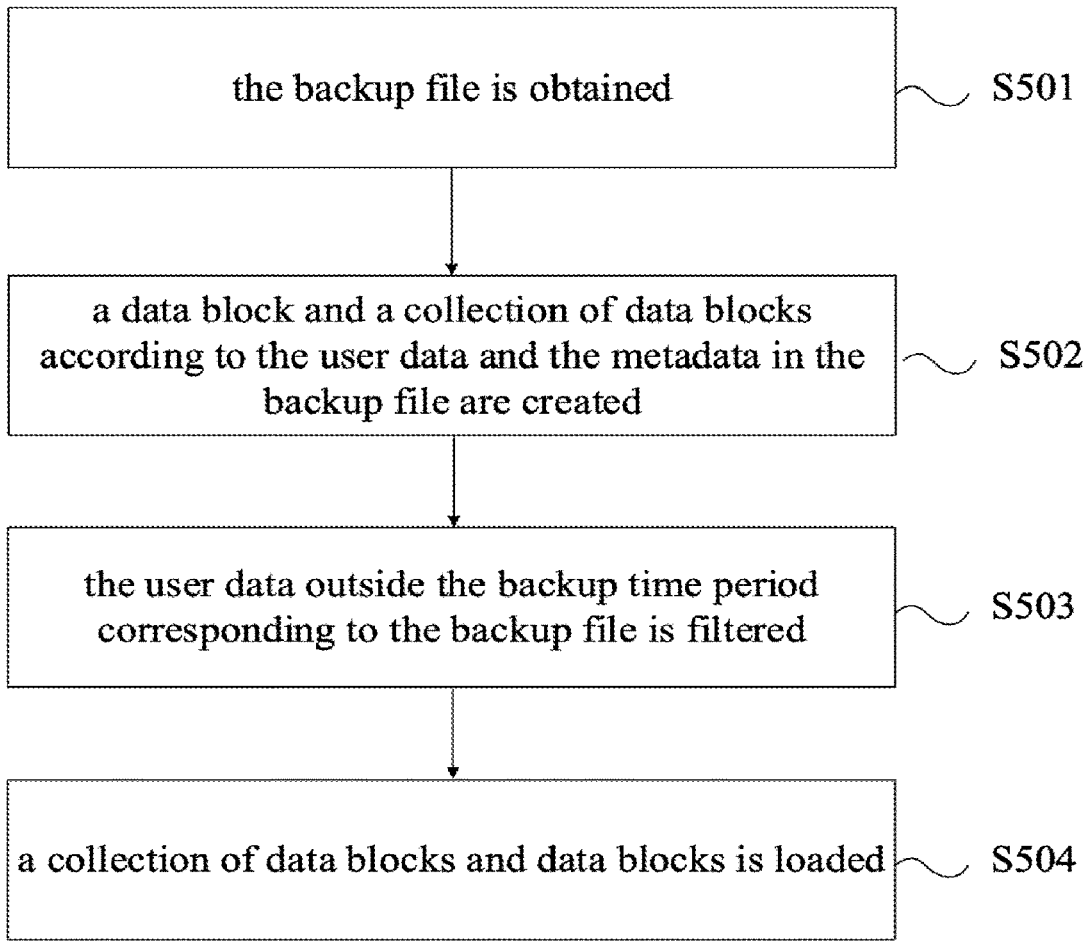
FIG. 5 is a graph showing a data recovery method according to an embodiment of the disclosure.

The method shown in FIG. 5 includes:

In S501, the backup file is obtained.

Illustratively, the backup file herein may be the final backup data that has been saved in the MinIO of the Milvus database. After the backup file is read from the MinIO, the validity of the backup file can also be verified. After the verification is successful, it indicates that the backup file can be normally used for data recovery.

In S502, a data block and a collection of data blocks according to the user data and the metadata in the backup file are created.

Illustratively, the data block and the collection of data blocks are re-created based on the data, the user data, and the metadata stored in the backup file.

In S503, the user data outside the backup time period corresponding to the backup file is filtered.

Illustratively, a backup time period corresponding to a backup file is acquired, and a start time(time_of_seal) for performing a status update operation in the backup time period is determined. For the insertlog in the binlog of the Milvus database, a record of user data after the time_of_seal is filtered out, and it is ensured that new inserted data after the completed data backup operation is not recovered. For the deletelog in the binlog of the Milvus database, the record after the timestamp of time_of_seal is filtered to ensure that the delete record before the completion of the data backup can be performed correctly.

In S504, a collection of data blocks and data blocks is loaded.

Illustratively, after the collection of data blocks and data blocks is restored, the Milvus database may load the collection of data blocks and data blocks so that the user can access the user data for which the restoration is completed.

It can be seen that, when the data recovery method described in FIG. 5 is executed for data recovery, since the time point of the backup operation when the backup file is generated is relatively accurate, it is possible to accurately recover the data that has been backed up, and it is also possible to ensure that the segmentation point of the delete data in the backup process is easy to locate, the delete data can be processed normally, the processing truncation point of the delete data is clear, and the delete data to be processed and the delete data not to be processed can be explicitly segmented.

Embodiments of the present disclosure further provide an electronic device including a memory for storing instructions for execution by one or more processors of the electronic device, and a processor that is one of the one or more processors of the electronic device for performing the above construction method.

Figure 6:
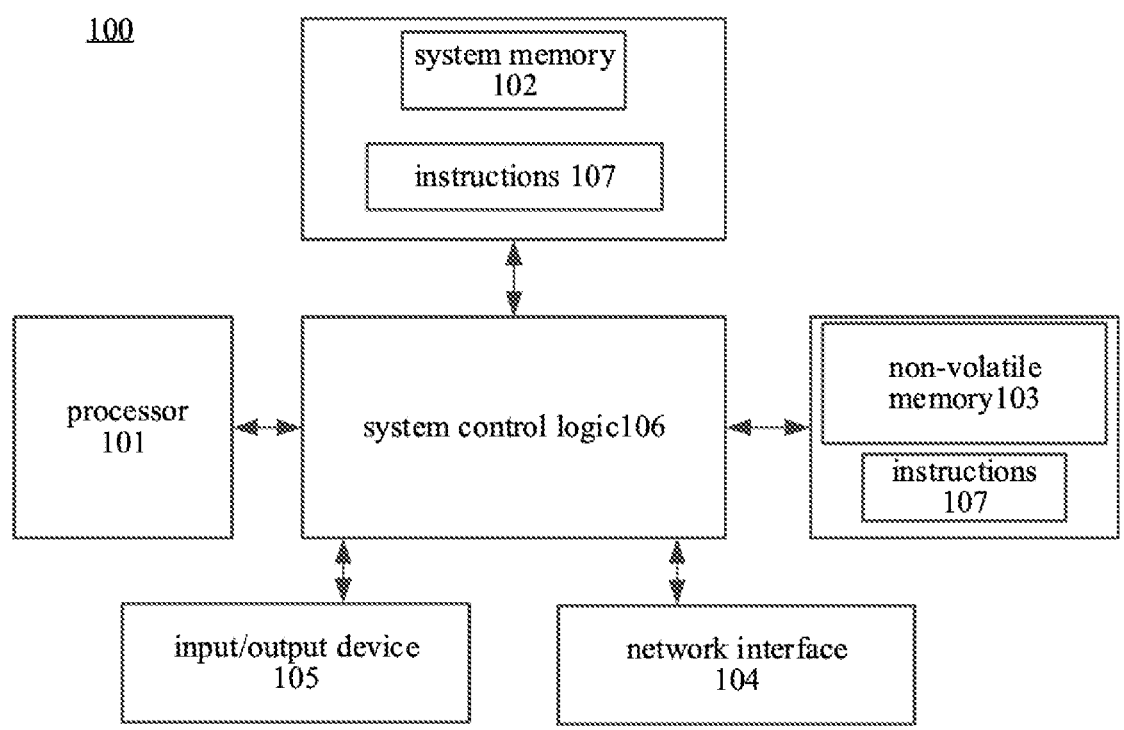
FIG. 6 is a graph showing a hardware structure of an electronic device according to an embodiment of the disclosure.

As shown in FIG. 6, the electronic device 100 includes a processor 101, a system memory 102, a non-volatile memory 103, a network interface 104, and an input/output device 105, and system control logic 106 for coupling the processor 101, the system memory 102, the non-volatile memory 103, the network interface 104, and the input/output device 105.

The electronic device 100 may be a computer, a workstation, an intelligent terminal, an application server, an intelligent electronic device capable of automatically and at a high speed performing a large number of numerical calculations and various information processing according to a pre-stored program, or the like. This embodiment of the disclosure is not limited.

The processor 101 is configured to perform the performance evaluation method of the processor according to the embodiment of the disclosure and perform performance simulation of the processor 101. It will be appreciated that the electronic device 100 may also include a plurality of processors for performing performance emulation of other plurality of processors by the processor 101 performing the performance evaluation method of the processor according to the embodiments of the disclosure.

The system memory 102 and the non-volatile memory 103 may be used to temporarily or permanently store the instructions 107, and may also be used to temporarily or permanently store the parsing rules according to the data files retrieved from the electronic device 100 and for parsing the instructions from the data files.

The network interface 104 is used to communicate with other devices, for example, the electronic device 100 may communicate with a server through the network interface 104.

Input/output device 105 may be used for user interaction with electronic device 100.

It will be appreciated that the electronic device 100 may also be a smart television, a smart speaker, a tablet computer, a server, a wearable device, a head mounted display, a mobile e-mail device, a portable game machine, a portable music player, a reader device, or the like, and the embodiments of the disclosure are not limited.

It is to be understood that while the terms "first," "second," and the like may be used herein to describe various features, these features should not be limited by these terms. These terms are used for differentiation only and are not to be construed as indicating or implying relative importance. For example, the first feature may be referred to as the second feature and similarly the second feature may be referred to as the first feature without departing from the scope of the exemplary embodiments.

In addition, various operations will be described as a plurality of operations separated from each other in a manner most conducive to understanding the illustrative embodiments; However, the order of description should not be construed as implying that these operations must depend on the order of description, many of which may be performed in parallel, concurrently, or simultaneously. In addition, the order of the operations may also be rearranged. When the described operation is completed, the process may be terminated, but may also have additional operations not included in the drawings. The processing may correspond to methods, functions, procedures, subroutines, subroutines, etc.

Reference in the specification to one embodiment, an example or an illustrative embodiment means that the described embodiment may include a particular feature, structure, or property, but each embodiment may or may not necessarily include a particular feature, structure, or property. Moreover, these phrases are not necessarily for the same embodiment. Furthermore, when particular features are described in connection with specific embodiments, the knowledge of those skilled in the art can affect the combination of these features with other embodiments, whether or not such embodiments are explicitly described.

The terms "comprising," "having," and "including" are synonyms unless the context dictates otherwise. The phrase "A/B" denotes "A or B". The phrase "A and/or B" denotes "(A), (B) or (A and B)".

As used herein, the term "module" may refer to, be part of, or include: A memory (shared, dedicated, or group) for running one or more software or firmware programs, an application specific integrated circuit (ASIC), an electronic circuit and/or processor (shared, dedicated, or group), a combinational logic circuit, and/or other suitable components providing the described functionality.

In the drawings, some structural or methodological features may be shown in particular arrangements and/or sequences. However, it should be understood that such a particular arrangement and/or ordering is not required. Rather, in some embodiments, these features may be illustrated in a manner and/or sequence other than that shown in the illustrative drawings. Additionally, the inclusion of structural or methodological features in a particular drawing does not imply that all embodiments are intended to include features that, in some embodiments, may not be included, or that may be combined with other features.

The embodiments of the disclosure have been described in detail above in connection with the accompanying drawings, but the use of the technical solutions of the disclosure is not limited to the various applications mentioned in the examples of the present patent, and various structures and variations can be readily implemented with reference to the technical solutions of the disclosure to achieve the various advantages mentioned herein. Various changes made without departing from the purpose of the disclosure shall fall within the scope of the patent of the disclosure, within the knowledge of those of ordinary skill in the art.

The invention claimed is:

1. An apparatus comprising:
a memory for storing database data; and
a processor configured to execute following process, comprising:
    determining a data set to be backed up, and performing a status update operation on a data block included in the data set to be backed up;
    recording a first timing when the data block changes from a first phase to a second phase;
    recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified,
    and wherein when the data block changes from the second phase to a third phase, and performing data backup on the data set to be backed-up to obtain a backup file, comprises: acquiring user data and metadata corresponding to the data block between the first timing and the second timing when a phase of the data block is changed to the third phase; storing the user data and the metadata as a backup file of the data set to be backed up,
    wherein the backup file further includes metadata corresponding to original backup data consisting of the user data and the metadata corresponding to the data block, with the metadata corresponding to the original backup data used to record a phase of the data block included in the data set to be backed up when performing the status update operation.

2. The apparatus according to claim 1, wherein the status update operation is used to operate the change of the data block in the first phase or the second phase to the third phase.

3. The apparatus according to claim 1, further comprising:
    determining a time period between the first timing and the second timing as a backup time, the backup file having an association relationship with the backup time.

4. The apparatus according to claim 3, further comprising:
    acquiring a data deleting operation performed on the to-be-backed-up data set within a time period corresponding to the backup time;
    there is an association between the data deleting operation and the backup time.

5. An apparatus comprising:
a memory for storing database data; and
a processor configured to execute following process, comprising:
    determining a to-be-restored data set, and acquiring a backup file corresponding to the to-be-restored data set, wherein the backup file includes user data and metadata corresponding to data block in the to-be-restored data set, and a phase of the data block;
    performing data recovery on the to-be-restored data set according to a backup time corresponding to the backup file, wherein the backup time is a time period between a first timing at which the data block changes from a first phase to a second phase and a second timing at which the data block changes from the second phase to a third phase during a process of data backup, wherein the first phase is used to indicate that the data block supports data writing and deleting, the second phase is used to indicate that the data block supports data deleting, and the third phase is used to indicate that the data block cannot be modified;
    performing a data deleting operation within a time period corresponding to the backup time to obtain user data and metadata corresponding to the to-be-restored data set.

6. The apparatus according to claim 5, further comprising:
restoring a phase of data blocks included in the to-be-recovered data set.

7. A data backup method performed by at least one processor, comprising:
    determining a data set to be backed up, and performing a status update operation on a data block included in the data set to be backed up;
    recording a first timing when the data block changes from a first phase to a second phase;
    recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified, and wherein when the data block changes from the second phase to a third phase, and performing data backup on the data set to be backed-up to obtain a backup file, comprises: acquiring user data and metadata corresponding to the data block between the first timing and the second timing when a phase of the data block is changed to the third phase; storing the user data and the metadata as a backup file of the data set to be backed up, wherein the backup file further includes metadata corresponding to original backup data consisting of the user data and the metadata corresponding to the data block, with the metadata corresponding to the original backup data used to record a phase of the data block included in the data set to be backed up when performing the status update operation.

8. A data recovery method performed by at least one processor, comprising: determining a to-be-restored data set, and acquiring a backup file corresponding to the to-be-restored data set, wherein the backup file includes user data and metadata corresponding to data block in the to-be-restored data set, and a phase of the data block; performing data recovery on the to-be-restored data set according to a backup time corresponding to the backup file, wherein the backup time is a time period between a first timing at which the data block changes from a first phase to a second phase and a second timing at which the data block changes from the second phase to a third phase during a process of data backup, wherein the first phase is used to indicate that the data block supports data writing and deleting, the second phase is used to indicate that the data block supports data deleting, and the third phase is used to indicate that the data block cannot be modified; performing a data deleting operation within a time period corresponding to the backup time to obtain user data and metadata corresponding to the to-be-restored data set.

9. A non-transitory computer-readable storage medium having stored thereon instructions that, when executed on an electronic device, cause the electronic device to perform a method comprising:
  determining a data set to be backed up, and performing a status update operation on a data block included in the data set to be backed up;
  recording a first timing when the data block changes from a first phase to a second phase; recording a second timing when the data block changes from the second phase to a third phase, and performing data backup on the data set to be backed-up to obtain a backup file, wherein the first phase is used to indicate that the data block supports data writing and deleting, the second phase is used to indicate that the data block supports data deleting, and the third phase is used to indicate that the data block cannot be modified,
  and wherein when the data block changes from the second phase to a third phase, and performing data backup on the data set to be backed-up to obtain a backup file, comprises: acquiring user data and metadata corresponding to the data block between the first timing and the second timing when a phase of the data block is changed to the third phase; storing the user data and the metadata as a backup file of the data set to be backed up,
  wherein the backup file further includes metadata corresponding to original backup data consisting of the user data and the metadata corresponding to the data block, with the metadata corresponding to the original backup data used to record a phase of the data block included in the data set to be backed up when performing the status update operation.

10. The non-transitory computer-readable storage medium according to claim 9, wherein the status update operation is used to operate the change of the data block in the first phase or the second phase to the third phase.

11. The non-transitory computer-readable storage medium according to claim 9, further comprising:
  determining a time period between the first timing and the second timing as a backup time, the backup file having an association relationship with the backup time.

12. The non-transitory computer-readable storage medium according to claim 11, further comprising:
  acquiring a data deleting operation performed on the to-be-backed-up data set within a time period corresponding to the backup time;
  there is an association between the data deleting operation and the backup time.

13. A non-transitory computer-readable storage medium having stored thereon instructions that, when executed on an electronic device, cause the electronic device to perform a method comprising:
  determining a to-be-restored data set, and acquiring a backup file corresponding to the to-be-restored data set, wherein the backup file includes user data and metadata corresponding to data block in the to-be-restored data set, and a phase of the data block;
  performing data recovery on the to-be-restored data set according to a backup time corresponding to the backup file, wherein the backup time is a time period between a first timing at which the data block changes from a first phase to a second phase and a second timing at which the data block changes from the second phase to a third phase during a process of data backup, wherein the first phase is used to indicate that the data block supports data writing and deleting, the second phase is used to indicate that the data block supports data deleting, and the third phase is used to indicate that the data block cannot be modified;
  performing a data deleting operation within a time period corresponding to the backup time to obtain user data and metadata corresponding to the to-be-restored data set.

14. The non-transitory computer-readable storage medium according to claim 13, further comprising:
  restoring a phase of data blocks included in the to-be-recovered data set.

* * * * *